US008482608B1

(12) United States Patent  
Sandoval

(10) Patent No.: US 8,482,608 B1
(45) Date of Patent: Jul. 9, 2013

(54) TRANS-CAM MAGNETICALLY MOUNTED CAMERA HOUSING DEVICE

(76) Inventor: Shaun C. Sandoval, Larkspur, CO (US)

( * ) Notice: Subject to any disclaimer, the term of this patent is extended or adjusted under 35 U.S.C. 154(b) by 592 days.

(21) Appl. No.: 12/661,437

(22) Filed: Mar. 17, 2010

Related U.S. Application Data

(60) Provisional application No. 61/161,394, filed on Mar. 18, 2009.

(51) Int. Cl.
H04N 7/12 (2006.01)
(52) U.S. Cl.
USPC ............ 348/143; 348/144; 348/151; 348/158
(58) Field of Classification Search
USPC .................................. 348/143, 144, 151, 158
See application file for complete search history.

(56) References Cited

U.S. PATENT DOCUMENTS

| | | | |
|---|---|---|---|
| 2,464,067 A | 3/1949 | Barker | |
| 3,535,442 A | 10/1970 | Jennings | |
| 3,720,147 A | 3/1973 | Bemis | |
| 3,739,703 A | 6/1973 | Behles | |
| 3,993,866 A | 11/1976 | Pearl et al. | |
| 4,160,999 A | 7/1979 | Claggett | |
| 4,217,606 A | 8/1980 | Nordmann | |
| 4,764,008 A | 8/1988 | Wren | |
| 5,122,427 A * | 6/1992 | Flowers et al. | ............... 429/97 |
| 5,184,215 A * | 2/1993 | Barker | ......................... 348/159 |
| 5,223,872 A | 6/1993 | Stiepel et al. | |
| 5,485,237 A * | 1/1996 | Adermann et al. | ............ 396/19 |
| 5,818,519 A | 10/1998 | Wren | |
| 5,886,738 A | 3/1999 | Hollenbeck et al. | |
| 5,926,210 A | 7/1999 | Hackett et al. | |
| 5,940,122 A | 8/1999 | Kizawa et al. | |
| 6,042,080 A | 3/2000 | Shepherd et al. | |
| 6,064,430 A | 5/2000 | Lefkowitz | |
| D479,546 S | 9/2003 | Yoshikawa | |
| 6,939,061 B2 * | 9/2005 | Sawada | ......................... 396/427 |
| 7,387,453 B2 | 6/2008 | Arbuckle | |
| 7,742,069 B2 | 6/2010 | Payne | |
| 8,259,708 B2 | 9/2012 | Cotton et al. | |
| 2009/0196597 A1 * | 8/2009 | Messinger et al. | ............ 396/427 |

* cited by examiner

Primary Examiner — Sath V Perungavoor
Assistant Examiner — Geepy Pe
(74) Attorney, Agent, or Firm — Ramon L. Pizarro; Edwin H. Crabtree

(57) ABSTRACT

A camera housing and mounting system for mounting surveillance equipment from the bottom of a power transformer is disclosed. The disclosed system uses magnetic self-adjusting attachment supports that use pivoting magnets mounted on threaded supports that allow adjustment of the length of protrusion of the supports, and thus for universal mounting application. The weather proof housing, outer covering, magnetic mounting system and electrical connections make the device user friendly and quick deployment and electrical connection to the power transformer.

4 Claims, 7 Drawing Sheets

TRANS-CAM MAGNETICALLY MOUNTED CAMERA HOUSING DEVICE

REFERENCE TO RELATED APPLICATIONS

This application claims the benefit of my provisional application having Ser. No. 61/161,394, filed Mar. 18, 2009, now abandoned

FIELD OF THE INVENTION

The present invention relates to system and method for providing a camera housing and camera housing supporting device. More particularly, but not by way of limitation, to a camera housing for supporting at least one surveillance camera or equipment from an electrical power transformer that is mounted from a structure such as a telephone pole, and which connects to existing lugs on the electrical power transformer in order to power the surveillance equipment.

BACKGROUND OF THE INVENTION

Surveillance cameras are currently attached to power poles with clamps, bolts, or straps, and have to tap into power lines. Installation of this type of equipment typically takes 45 minutes to 1 hour. The present invention, which is also referred to here as the Trans-Cam, provides an improved method of installation, which only takes approximately 10 minutes to install. The device taps power from the transformer and does not require cutting or spicing into high voltage lines.

SUMMARY OF THE INVENTION

It has been discovered that providing a housing adapted for attaching to a transformer that has at least one ferrous portion and at least one power outlet lug can solve the problems left unanswered by known art, the surveillance camera housing includes:

A support panel that includes at least one magnet;

A housing that is attached to the support panel, the housing including sides and at least one window, the housing containing a power supply, a wireless modem, and a camera that is connected to the wireless modem;

A power chord, the power chord providing power to the power supply and being adapted for attaching to at least one power outlet lug on the transformer, so that the housing may be supported from ferrous portion of the transformer while the power supply is connected to the power outlet lug.

It will be understood that the disclosed invention allows a user to mount a surveillance camera from a transformer that is mounted from a telephone pole or power transmission tower, and be able to draw power for operating the surveillance equipment contained within the housing of the invention from the transformer itself. This will lighten the weight of the surveillance system, due to the elimination or reduction of the amount of power to be from batteries, and thus facilitate mounting and support of the device from a ferrous surface of an existing transformer.

An important advantage of the disclosed system is that it greatly reduces the amount of time that is needed to mount the surveillance equipment. This is advantageous due to the labor savings and due to the fact that spending less time spent setting up surveillance equipment at the surveillance location is likely to prevent detection or suspicion of the fact that the equipment is concealing surveillance devices.

The modem held within the housing will be a wireless modem that will transmit the surveillance information over the Internet using known IP transmission methods that can include the use of cellular telephone network systems or other wireless communications systems.

Thus, a preferred embodiment of the disclosed invention relates to a camera housing adapted for mounting from the bottom of a transformer, and more particularly, but not by way of limitation, to a camera housing and method for supporting a camera from the bottom of a transformer, and which includes a power connection for attaching to electrical power posts on a transformer.

DETAILED DESCRIPTION OF THE INVENTION

Figure 1:
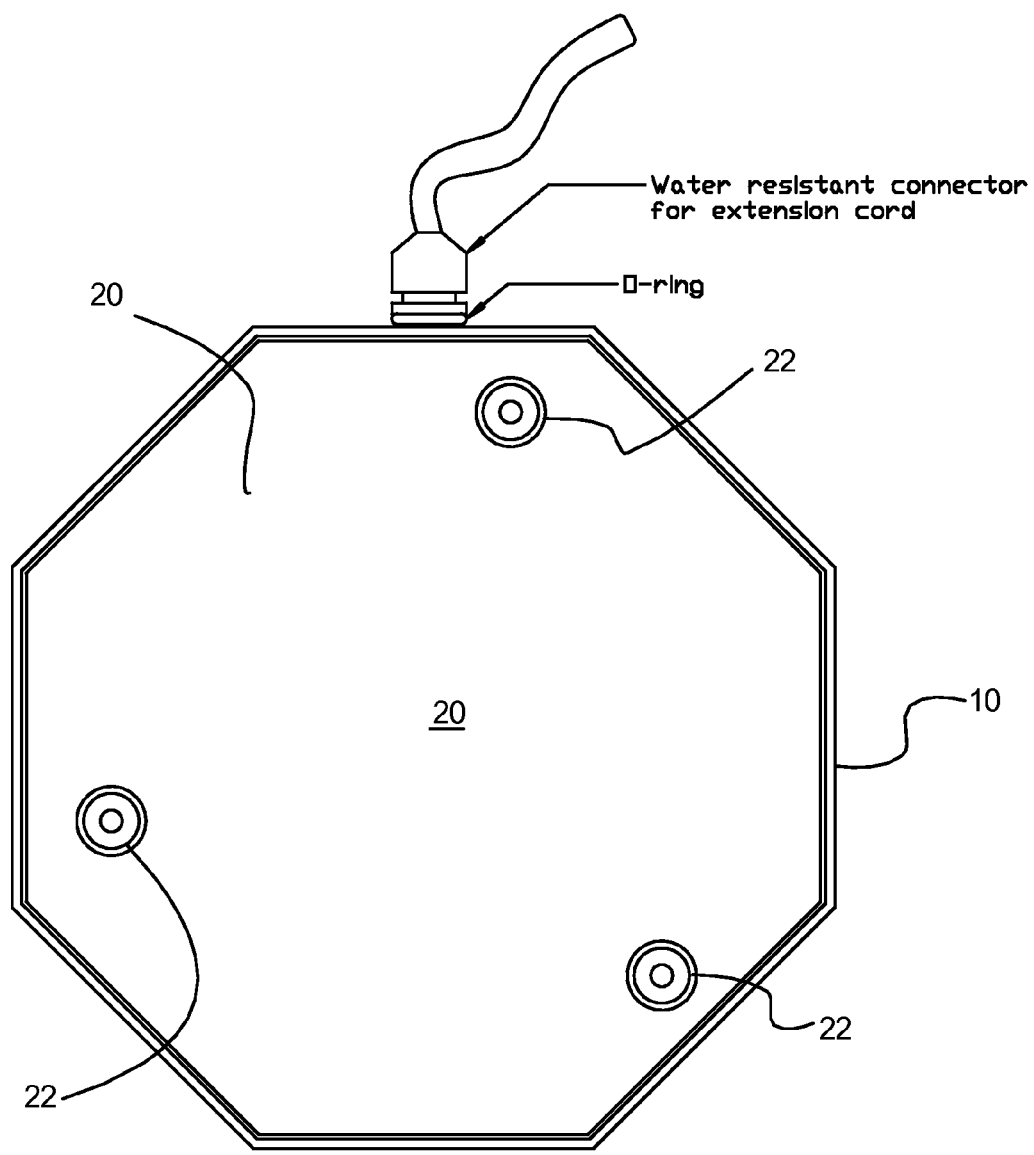
FIG. 1 is a plan view showing the housing and mounting platform, made of formable material.
Figure 2:
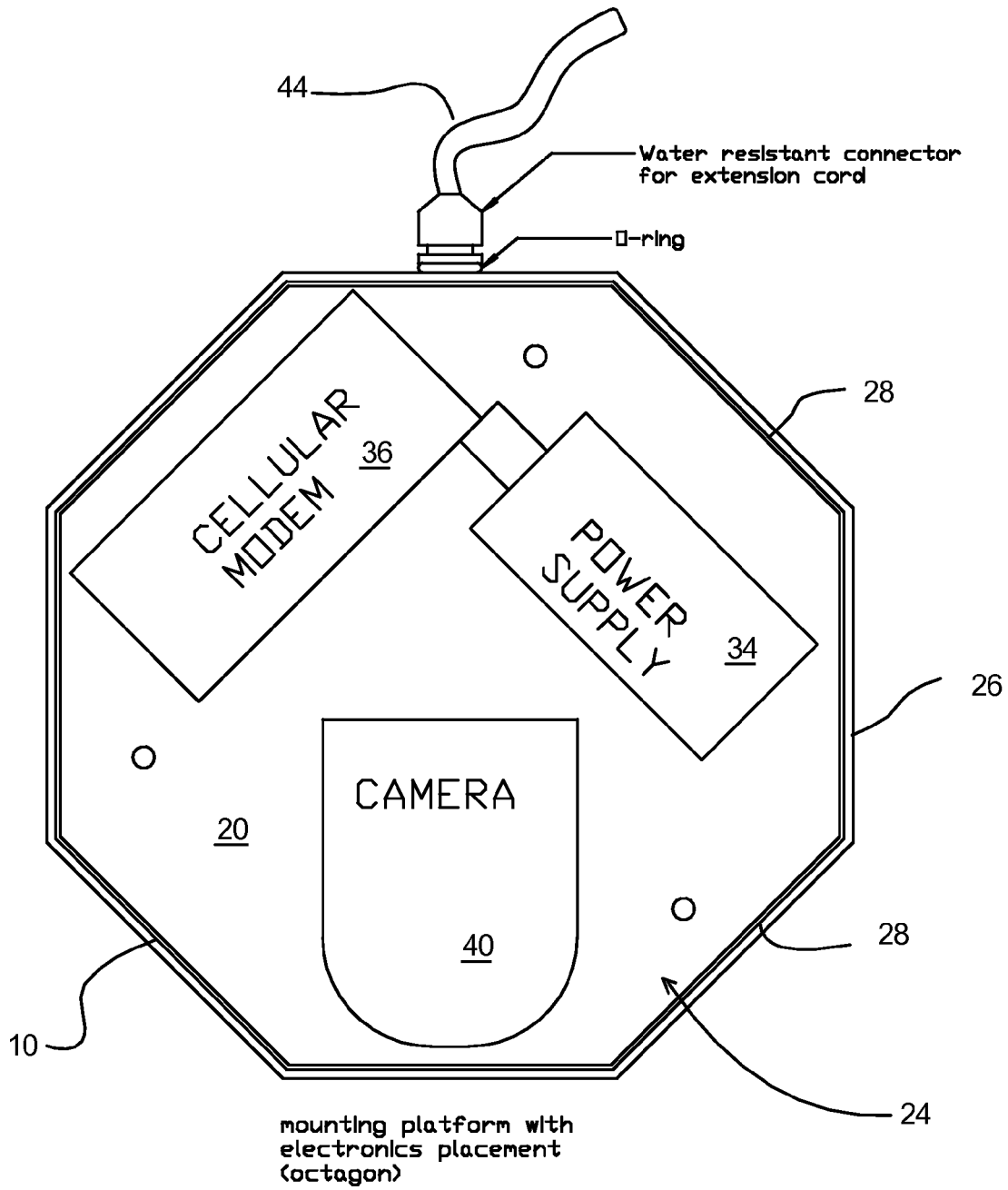
FIG. 2 shows the mounting platform with electronics placement
Figure 3:
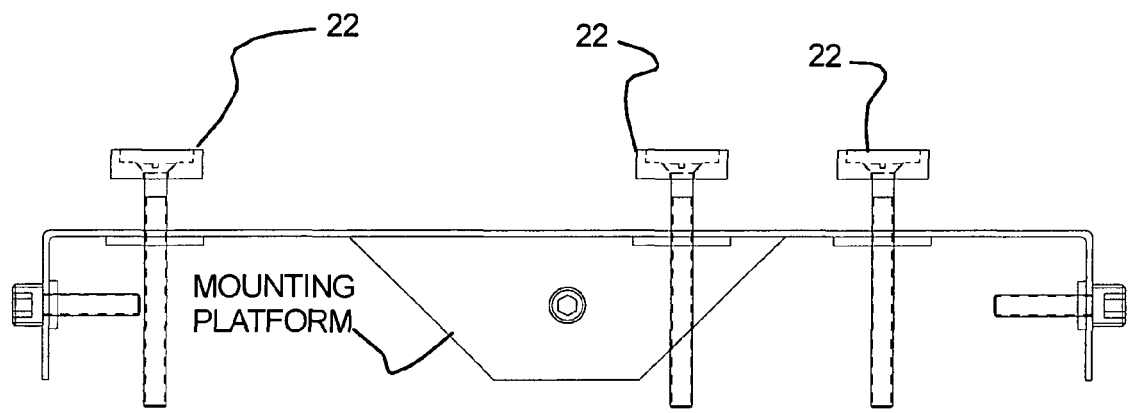
FIG. 3 shows a side view of the mounting platform with fasteners and magnetic mounts.
Figure 4:
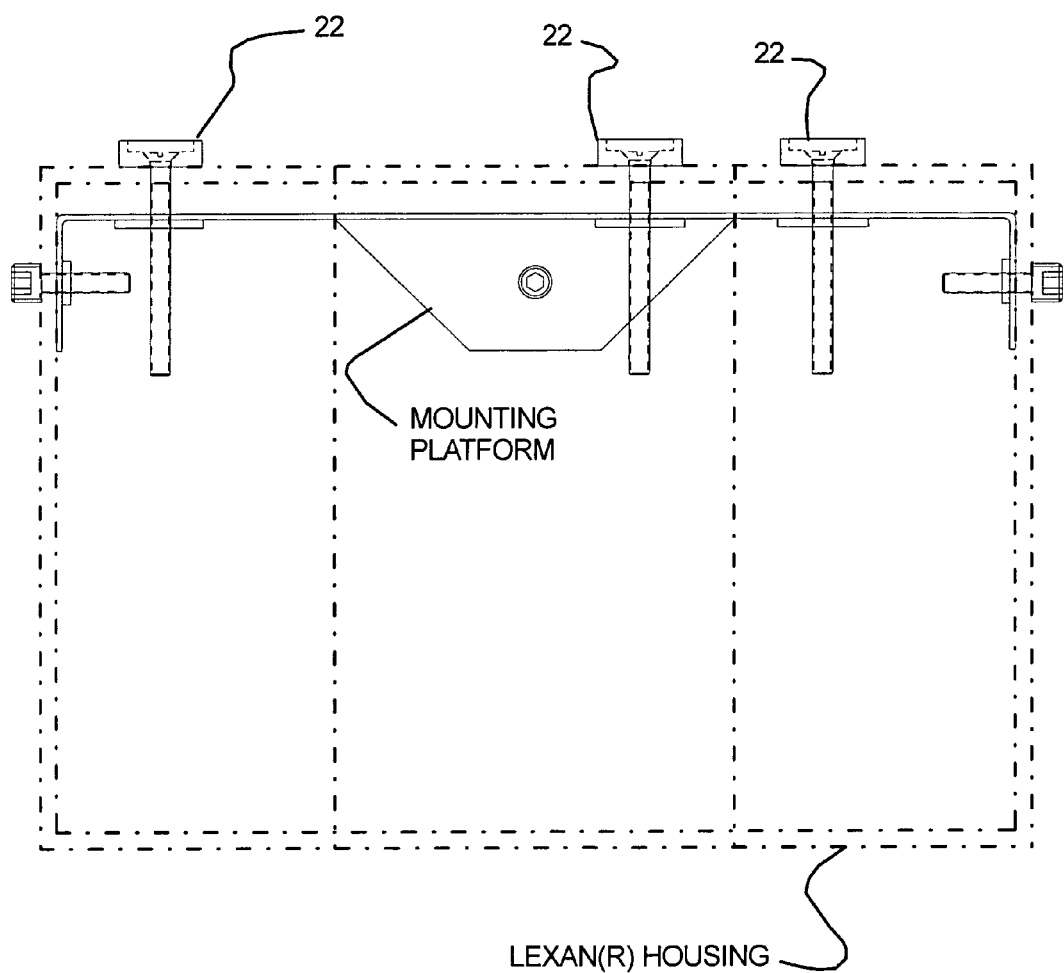
FIG. 4 shows a transparent side view with mounting system and formable material housing.
Figure 5:
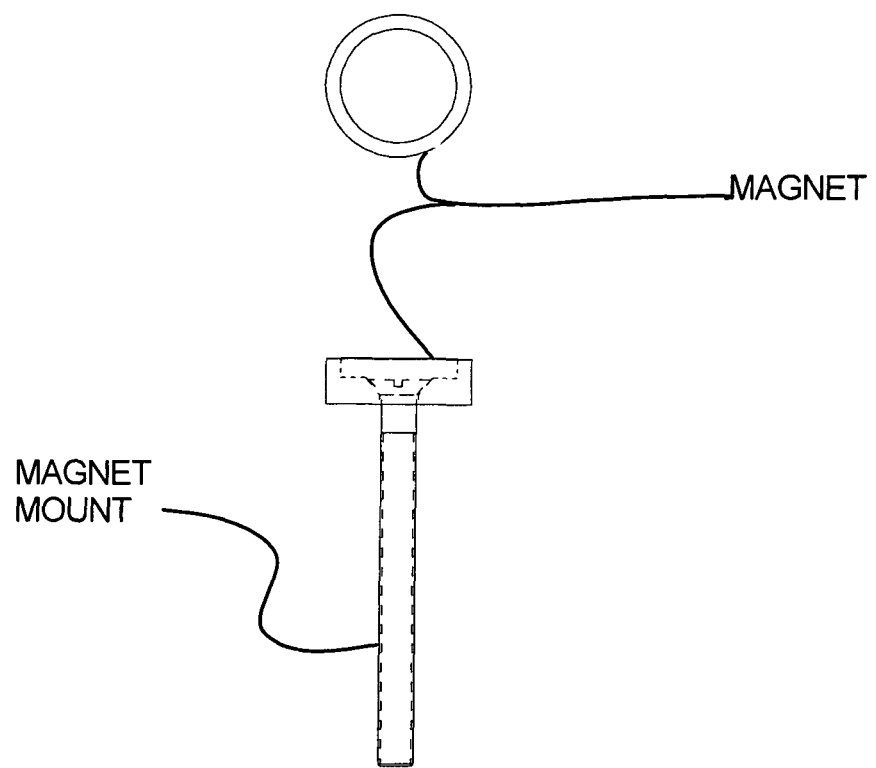
FIG. 5 shows different components of the magnetic mounting apparatus. Drawing shows how the magnet can rotate on the support mechanism.
Figure 6:
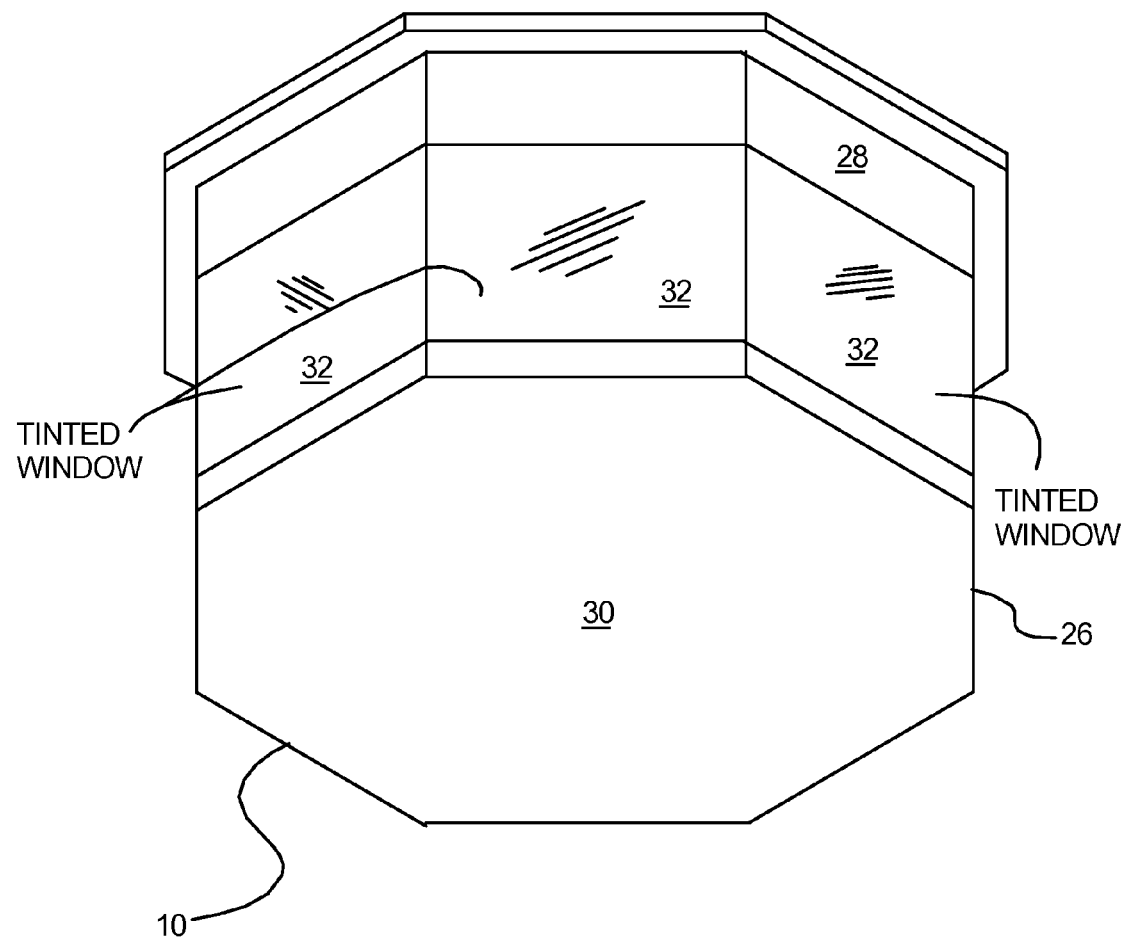
FIG. 6. shows a three-dimensional view of the device.
Figure 7:
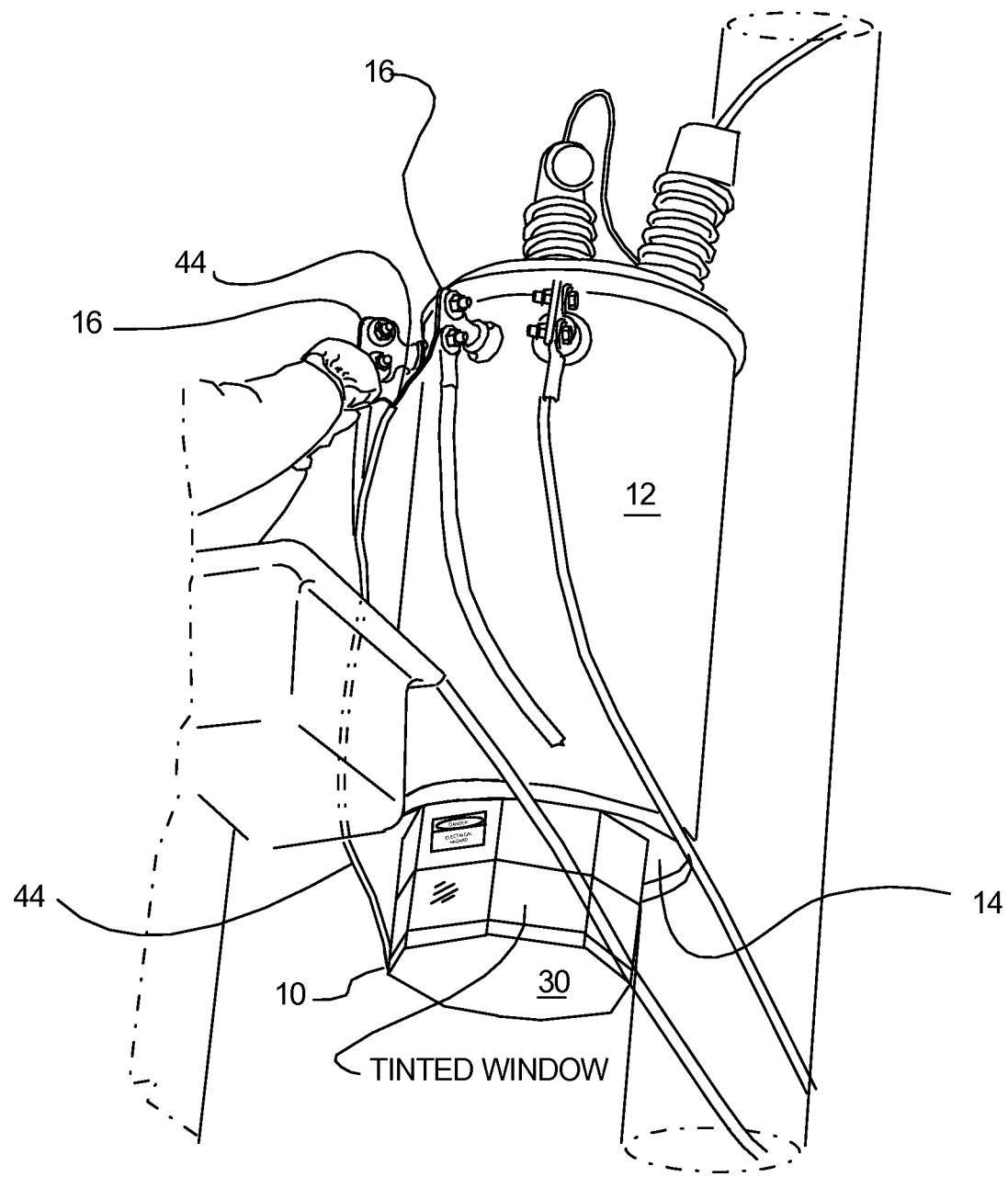
FIG. 7. shows an example of the disclosed invention mounted on a high voltage power transformer and connected to power outlet lugs on the transformer.

It is contemplated that the disclosed surveillance camera housing 10 may be round or octagon shaped, could be of any suitable shape that allows mounting of the device from a high voltage power transformer. Turning to FIG. 7, it will be understood that it is contemplated that the transformer 12 from which the disclosed surveillance camera housing 10 will include a surface that is made from a ferrous material. In the example illustrated in FIG. 7, the bottom panel 14 of the transformer 12 is made from a ferrous material, such as a mild steel. Still further, FIG. 7 illustrates that it is contemplated that the "footprint" of the surveillance camera housing will be smaller than the bottom panel 14, which will result in an unobtrusive, inconspicuous, installation that is difficult to detect as being a surveillance device by a passer-by. Still further, it will be understood that the disclosed invention will use power take-off lugs 16 that are present on many power transformers as a source of power for the surveillance equipment within the device. This will further camouflage the invention, in that electrical power transformers often include power lines that extend along the transformer.

FIGS. 1-7 illustrate that the disclosed surveillance camera housing 10 will include a support panel 20 that includes at least one magnet 22. The support panel 20 covers and provides access to the internal area 24 of the disclosed surveillance camera housing 10, where the surveillance equipment 24 is held. Thus, in the disclosed preferred embodiment of the invention the support panel 20 will be over the housing body 26 of the surveillance camera housing 10.

The housing body 10 that attaches to the support panel 20 includes sides 28, a floor 30, and at least one window 32. The enclosed figures also illustrate that the housing 10 will contain a power supply 34, such as a transformer that will convert the power obtained from the power transformer 12 to a desired DC (direct current) voltage or lower voltage as required by the surveillance equipment stored in the surveillance camera housing 10. Additionally, a wireless modem 36, that is adapted for sending IP communication signals that carry the video and or sound information through the surveillance equipment 24 within the surveillance camera housing 10. Accordingly, it is contemplated that the surveillance equipment will include a camera 40 that is connected to the wireless modem 36.

The power obtained from the lugs 42 of the power transformer 12 is obtained through a power chord 44. The power chord 44 has been adapted for attaching to at least one power outlet lug 42 on the transformer 12, so that the housing may be supported from ferrous portion of the transformer 12 while the power supply 34 is connected to the power outlet lug 42. Ground may be provided through another lug or through the contact of the magnets and the mechanism used to attach the magnets to the support panel 20 that supports the housing 10 from the power transformer 12.

Size—current embodiments are approximately 11 inches in diameter by 7 inches tall, but may be of any size. The device is held magnetically to the underside of a transformer and the power is tapped directly from the transformer. This device has reduced the deployment time to less than 10 minutes.

The device houses an IP camera, modem (cellular or DSL Internet Protocol (IP) data transfer device), and power supply. The camera can be viewed and controlled utilizing the Internet. A complete system may include housing, camera, modem, viewing software, computer storage for video, and carrier service for the modem. The device could house any components that would be desired.

The mounting system uses three adjustable Rare earth (neodymium, samarium-cobalt, and hybrids of rare earth) magnets and a safety tether. The safety tether is used in the event the device breaks loose or is dropped; it will prevent device from falling to the ground.

The device has a weather proof seal may be used between mounting surface and existing attachment point. This weatherproof seal work on any plane and on uneven surfaces.

The magnetic rotating cup anchor system allows the magnets to move to the plane of the mounting surface. The anchor systems work independently of each other allowing adhesion to any surface, flat plane, concave, convex, irregular or any combination a magnet will adhere to. The rotating cup is attached to a threaded bolt that allows the adjustment for depth. With this mounting system the device can be mounted in any position including bottom, top or side of attachment surface. The three magnets rotating attachment devices achieve a holding force over one hundred pounds. With the use of larger magnets the system has the ability to hold any amount of weight that the magnets will hold.

The device allows the use of any camera types or other equipment. A viewing window is used for the camera or other equipment to see out of. This viewing area may cover any radius up to 360 degrees. Common embodiments cover 90 to 120 degrees. The formable housing include cut out area for camera lens or other equipment to operate from. The formable housing may be made with any formable material but is generally made with optically clear material, such as tinted or clear acrylic and polycarbonate. This housing is preferably attached by stainless steel fasteners that are equipped with O-ring seals to protect the weatherproof integrity of the device. The placement and design of these fasteners allow quick access to the internal components of the device. The exterior is wrapped with a poly vinyl chloride (PVC) shrink wrap that can be custom fabricated to any color or any camouflage to fit into an environment. The material is an ultraviolet and light inhibitor. The PVC wrap will form any shape. Windows or openings can be made in the material for the camera or other instrument to view or operate from.

The power to operate the enclosed equipment is tapped directly from the transformer. The power supply cord has universal split ring terminals that fit most transformers in the United States and can be configured to fit any transformer terminal or splicing situation. A magnetic tether may be used to stabilize the power supply cord. The magnetic anchor is a neodymium magnet housed in a metal housing that is threaded and comes complete with a disposable zip tie that is attached with a bolt. The power supply cable is zip tied to the magnet assembly and the assembly is magnetically attached to the transformer or other surface. This holds the cable in place and relieves the strain from the wire to terminal connection.

Camera may be used for covert surveillance and blend into its environment.

Neodymium magnets come in different sizes, including ⅝ and 1 inch. This invention may work with any size and strength of magnet appropriate for holding camera.

Other uses of the disclosed housing include the mounting laser listening devices from electrical transformers, or mounting controlling devices.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

The invention claimed is:

1. A surveillance camera and housing for mounting from a power transformer that is mounted from a telephone pole, the power transformer having a lower surface that is generally planar and made from a ferrous material, the surveillance camera and housing comprising:

a support panel that includes at least three magnets, each of the magnets being independently connected to the support panel through a threaded support that allows individual adjustment of the distance between the magnet and the support panel;

a housing body that is attached to the support panel, the housing including sides, a floor, and at least one of the sides including at least one window, the surveillance camera housing containing a power supply, a wireless modem, and a camera that is connected to the wireless modem;

a power chord, the power chord providing power to the power supply and being adapted for attaching to at least one power outlet lug on the transformer, so that the surveillance camera housing may be supported from ferrous portion of the transformer while the power supply is connected to the power outlet lug.

2. A surveillance camera and housing according to claim 1 wherein said housing body extends over said support panel and each of said threaded supports extends through the housing body.

3. A surveillance camera and housing according to claim 1 wherein the relationship of said housing body and said support panel can be adjusted, so that the relationship of the camera and the at least one window can be adjusted, and so that the housing is adapted to be positioned at a desired relationship to the transformer.

4. A surveillance camera and housing for mounting from a power transformer that is mounted from a telephone pole, the power transformer having a lower surface that is generally planar and made from a ferrous material, the surveillance camera and housing comprising:

a support panel that includes at least two magnets, each of the magnets being independently connected to the support panel through a threaded support that allows individual adjustment of the distance between the magnet and the support panel;

a housing body that is attached to the support panel, the housing including sides, a floor, and at least one of the sides including at least one window, the surveillance camera housing containing a power supply, a wireless modem, and a camera that is connected to the wireless modem;

a power chord, the power chord providing power to the power supply and being adapted for attaching to at least one power outlet lug on the transformer, so that the surveillance camera housing may be supported from ferrous portion of the transformer while the power supply is connected to the power outlet lug.

* * * * *